March 10, 1959    H. S. COOPER ET AL    2,877,110
RECOVERY OF MANGANESE FROM METALLURGICAL
SLAGS, DUSTS AND ORES
Filed May 3, 1957
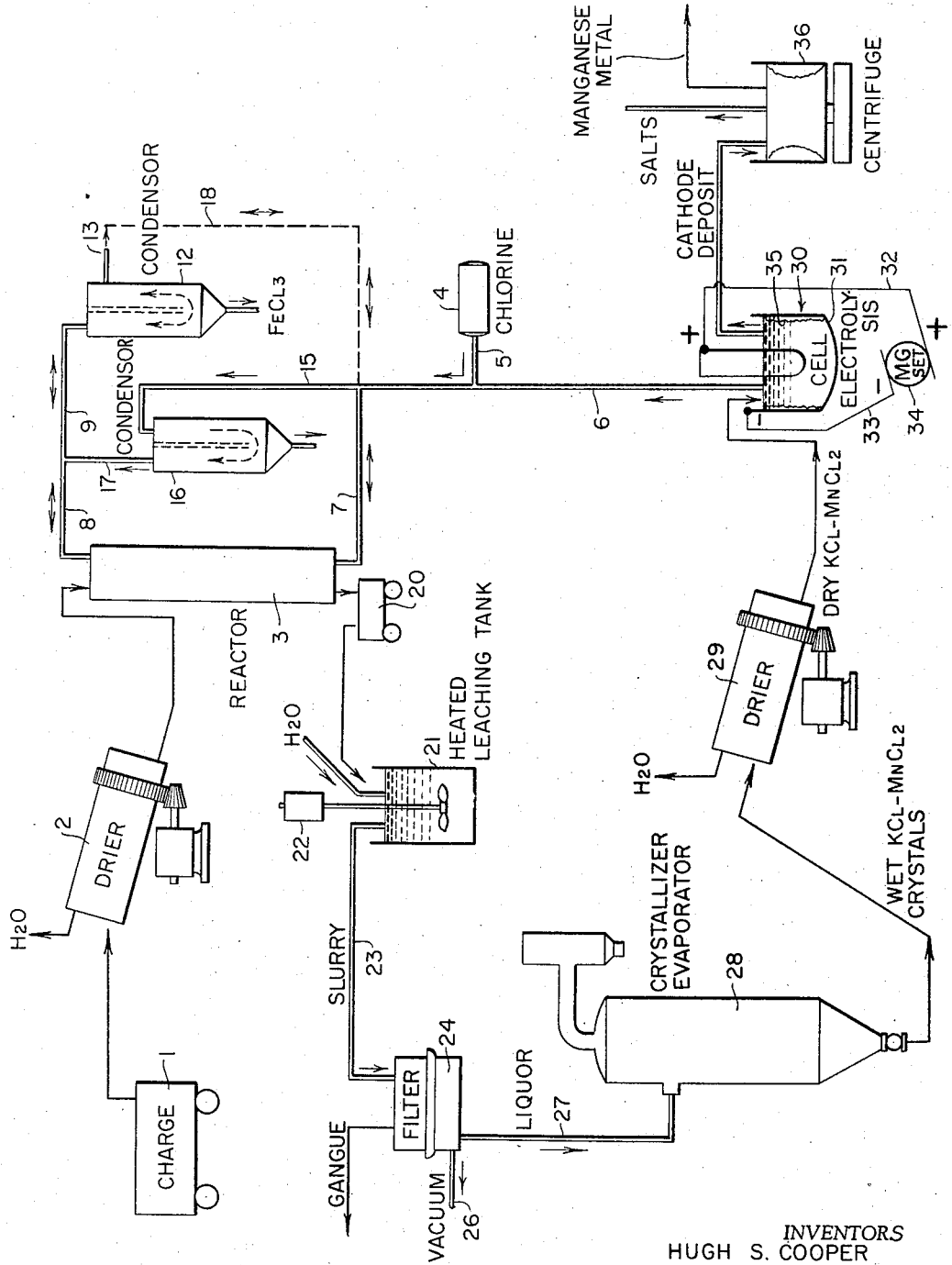
INVENTORS
HUGH S. COOPER
JAMES C. SCHAEFER
ERNEST C. SCHMIDT
BY *Evans & Pearne*
ATTORNEYS

United States Patent Office 2,877,110
Patented Mar. 10, 1959

2,877,110

RECOVERY OF MANGANESE FROM METALLURGICAL SLAGS, DUSTS AND ORES

Hugh S. Cooper, Shaker Heights, James C. Schaefer, Cleveland, and Ernest C. Schmidt, Euclid, Ohio, assignors to Walter M. Weil, Shaker Heights, Ohio Application May 3, 1957, Serial No. 656,814

13 Claims. (Cl. 75—111)

This invention relates to the recovery of substantially pure, carbon-free manganese from metallurgical dusts, slags, and natural and synthetic ores containing manganese in the form of metal, or oxide, or both, generally in admixture with relatively large quantities of undesired materials such as carbon and the oxides of alkali metals, alkaline earth metals, iron, aluminum, silicon, and the like. The invention is particularly suited for the recovery of manganese from so-called "precipitator dusts" collected in the course of various metallurgical operations, such as the production of steel. However, the invention is also applicable to the recovery of manganese from metallurgical slags and natural and synthetic ores in which the various commonly occurring undesired materials are present in varying quantities compared to the manganese content.

The invention will be described herein with particular reference to the recovery of manganese from precipitator dusts of the character referred to above. Such precipitator dusts are collected in huge quantities in the steel industry, generally by electrostatic collectors such as Cottrell precipitators. Although these dusts generally contain substantial quantities of manganese, up to as high as about 25% by weight, it has never been considered economically practical heretofore to recover the manganese from such dusts in a form suitable for use in the metallurgical industry.

Because finely divided manganese metal is rapidly oxidized under normal atmospheric conditions, the manganese in these dusts is generally present, at least in substantial part, as manganese oxide (MnO and/or $MnO_2$), although a substantial quantity may be present as metal.

Typical precipitator dusts collected in the steel industry are originally collected in a very finely divided form and dumped in outdoor piles where the material is burned to decompose cyanides contained therein. This causes a sintering and agglomeration of the dust particles, with some oxidation of metallic constituents, and the material is largely transformed to a mass of gravel-like, porous particles ranging from around 1/8 inch to 1/4 inch in maximum dimension. The thus transformed dusts contain various elements and compounds in about the range of proportions set forth in the following table:

Table I

| Constituent: | Dry basis analysis, percent |
|---|---|
| Mn | 15.20–23.70 |
| Fe | 0.80–9.22 |
| C | 2.61–4.43 |
| S | 0.30–3.90 |
| P | 0.04–0.19 |
| CaO | 9.30–10.35 |
| MgO | 0.90–9.50 |
| $SiO_2$ | 10.35–11.40 |
| $Al_2O_3$ | 5.87–8.14 |
| CN | 0.00–0.023 |
| CNS | 0.00–1.49 |
| $Na_2O$ | 1.89–2.35 |
| $K_2O$ | 9.98–17.75 |
| $Li_2O$ | 0.00–0.21 |

As indicated, the manganese content, and the iron content as well, may be present partly as oxide and partly as metal. Also, since the dusts are generally accumulated in piles out of doors, they may absorb substantial quantities of water, up to as much as 25% or more of the total weight.

Though the present invention is of immediate interest primarily for recovering manganese or ferromanganese from precipitator dusts, it is obviously not restricted in its utility by the source or origin of the starting materials and may be used to process a variety of ores, slags, and the like containing manganese.

In a prior Patent No. 2,752,299 granted June 26, 1956, to Hugh S. Cooper, a process was described and claimed for the recovery of substantially pure carbon-free manganese and iron powders and ferromanganese powder from various materials such as ores, steel slags, and high-carbon ferromanganese. While the process described and claimed in that patent is admirably adapted to the recovery of manganese values from materials of the character referred to therein, which generally contain little or no alkali metal oxides and relatively little or no carbon, the presence of substantial quantities of alkali metal oxides and/or carbon presents troublesome problems in the selective chloridizing and volatilizing of iron and manganese chlorides from the starting materials in accordance with the procedure described in that patent for producing anhydrous iron and manganese chlorides, from which the iron and manganese values may be subsequently extracted by fused salt bath electrolysis.

One of the principal objects of the present invention is to recover manganese values in an efficient and economic manner from materials containing alkali metal oxides and carbon and which are, therefore, difficult to handle in accordance with the process of that patent.

Another characteristic of the process of that patent which tends to restrict its field of use is that it involves the production of manganese chloride vapor at high temperature and requires that the vapor be conducted into and condensed in a suitable condenser. Manganese chloride, in the liquid phase, is highly reactive or corrosive when brought into contact with many materials of construction. Thus, the production and subsequent condensation of gaseous manganese chloride presents problems in avoiding the presence of liquid manganese chloride at any point in the system, particularly in the presence of alkali metal chlorides which form low melting eutectics with manganese chloride. Also, the elevated temperatures required for vaporizing manganese chloride (800° C. or higher) involve the consumption of substantial quantities of fuel, and it is obviously desirable to effect whatever fuel savings are possible in any industrial process.

Therefore, another object of the present invention is to recover manganese values from materials of the character described above by a procedure involving conversion of the manganese to manganese chloride without appreciable fusion and substantially without any volatilization, so that no liquid manganese chloride can come into contact with any part of the apparatus, and so that significantly lower temperatures may be employed during the chloridization operation.

Other objects of the invention are to provide a process for recovering high purity manganese metal from materials of the character described above by a relatively simple procedure and with high efficiency and economy and, more particularly, to do this in a closed system in which the reagent used for chloridizing the manganese is substantially completely recovered and reused for further chloridization.

Still another object of the invention is to provide a process of the foregoing character in which iron in the starting material may be eliminated so as to produce substantially iron-free manganese metal and a useful iron chloride by-product.

Reduced to its simplest form, the process as carried out in accordance with the present invention involves contacting the manganese containing material with a chloridizing gas at a temperature sufficient to effect rapid chloridization of the manganese, but low enough to avoid separation from the reaction mass of any molten or gaseous manganese chloride, and low enough to avoid chloridizing gangue materials such as calcium, magnesium, aluminum, and silicon oxides, even in the presence of appreciable carbon where this element is present in the starting material. When operating at such a temperature, the manganese and any iron, phosphorus, and alkali metals present in the starting material are chloridized. The iron and phosphorus chlorides are volatilized, removed from the reaction zone, and condensed, but the manganese and any alkali metal chlorides remain in the reaction mass. Other commonly encountered constituents of the starting material such as carbon, alkaline earth metal oxides, silica, alumina and the like resist chloridization at the temperatures employed and remain substantially unchanged in the reaction mass. However, sulfur and other more volatile materials are also removed with any iron and phosphorus chlorides formed in the course of the reaction.

The chloridized mass is then introduced into a relatively large volume of water, preferably heated substantially to the boiling point, to dissolve the manganese and alkali metal chlorides. These chlorides being very water soluble, they are readily dissolved in this manner, whereas substantially none of the other constituents of the chloridized mass is soluble. The resulting solution, together with any entrained undissolved solids, is passed to a suitable filter, or equivalent mechanical separator, for separating the solution of manganese and alkali metal chlorides from the undissolved materials, and the filtrate is evaporated to recover the dissolved chlorides in crystalline form. After substantially complete drying of the manganese and alkali metal chlorides, they are dissociated, preferably by fused salt electrolysis to deposit manganese metal at the cathode and release the chlorine associated therewith at the anode of the cell.

In an electrolytic cell, the alkali metal chloride serves as a fused vehicle for the manganese chloride and tends to reduce the melting point of the bath, which may be as low as 428° C., depending upon the proportions of the constituents and the particular alkali metal chloride or chlorides that are present. A substantial quantity of alkali metal chloride is helpful for this purpose, but the amount present is not critical and increases to substantially 100% of the bath as electrolysis proceeds. Electrolysis of the bath is conducted well above its melting point, with or without further salt additions, until the bath is eventually substantially exhausted of manganese chloride. At this point, the remaining alkali metal chloride may be largely decanted from the cell and the manganese metal deposit, in the form of relatively fine grains or crystals, may be scraped from the cell, or the deposit may be removed from the cell by a sieve-type of scoop or the like. Alternatively, after decanting off most of the alkali metal chloride, the entire contents of the cell may be emptied into a suitable centrifuge, while maintaining the temperature sufficiently high to permit substantially complete separation of the remaining molten alkali metal chlorides and recovery of the manganese metal with a relatively small quantity of alkali metal chloride on the surface of the metal grains or crystals.

Final purification of the manganese metal without appreciable oxidation may be effectively carried out by simply sintering or melting the metal in a crucible to permit stratification of the entrained alkali metal chlorides on top of the manganese metal. Upon cooling and solidification, there is a clean plane of separation of the two phases and the manganese metal is readily recovered in substantially pure massive form. Where manganese of high metallic content is not essential, i. e., surface oxidation may be tolerated, the soluble alkali metal chlorides may be removed by leaching with water.

A characteristic of the process of the invention that contributes to its versatility in handling various starting materials is the ease with which iron may be substantially completely and selectively removed from the starting material during the chloridizing operation. Iron and iron oxides in contact with chlorine are rapidly converted to ferric chloride ($FeCl_3$), which begins to sublime at about 315° C. and is rapidly evolved as gaseous $FeCl_3$ at temperatures well below the preferred chloridizing temperature used in this process, i. e., about 500° to 650° C. Thus, with a relatively short treatment of the starting material with a chloridizing gas in the preferred temperature range, substantially all iron in the starting material, even though it may comprise a substantial portion thereof, is substantially completely removed from the reaction zone. Thus, the process of the invention is capable of producing high purity manganese metal, substantially free of iron as well as carbon, from a variety of starting materials in which the iron content may be two or three times as great as the manganese content.

The foregoing objects, characteristics, and advantages of the invention will be more fully understood from the following detailed description of the process and of a system and apparatus preferably employed for carrying out the process, as shown in the accompanying drawing.

Referring to the drawing, various elements of the system for carrying out the invention involve manipulative operations which may be performed in a number of generally equivalent well known types of apparatus. Accordingly, the details of such elements, for the most part, are not critical and are shown entirely in a schematic manner in the drawing.

Any suitable transporting device or equivalent mechanism 1 may be employed to operate, intermittently or continuously, for feeding granular, manganese containing material into a suitable preliminary drying device 2. Similarly, the drying device 2 may be intermittent or continuous in its operation. From the drying device 2, the thoroughly dried material may be fed, intermittently or continuously, into a reactor 3 where the dry material to be processed for the recovery of manganese is subjected to a chloridizing operation, either on a batch or a continuous basis. As indicated above, the drier 2 may be omitted if the material to be processed is substantially moisture free.

The dry material to be processed is charged into the reactor 3 to a suitable depth which will depend somewhat upon the size and character of the constituent particles of the material. The principal controlling factor in this respect is that a highly gas pervious bed of the material be maintained in the reactor. This bed of material is then heated in any desired manner, such as by an internal resistance heater or by the external application of heat to walls of the reactor in direct contact with the bed. When the charge has reached the desired temperature (explained hereinafter), chlorine gas or other suitable gaseous chloridizing reagent is introduced into the reactor from a source 4.

While other chloridizing gases than chlorine have been used heretofore in otherwise different processes, most of them are not suitable for use in the present process for various reasons. Some, like hydrogen chloride, convert iron to ferrous chloride, rather than ferric chloride. Effective formation and volatilization of ferrous chloride using hydrogen chloride as the reagent requires a much higher temperature, at which substantial quantities of manganese chloride may also be formed and volatilized and at which other metals in the charge material are likely to be chloridized, with serious impairment of the subsequent selective removal of manganese and alkali metal chlorides. Other chloridizing gases, such as phosgene, are so much more expensive than chlorine, or dangerous to use, or both, that they are ruled out of consideration for any present commercial use. From strict considerations of operativeness, any chloridizing gas which will react with iron and iron oxide to form ferric chloride below about 650° C. could be used in the iron removal step. Similarly, any chloridizing gas which will react with manganese and manganese oxide to form manganese chloride at a temperature below its melting point, without also chloridizing alkaline earth metal and aluminum oxides to form the corresponding chlorides, could be used herein for that purpose. However, chlorine is highly effective in the present invention, both for the removal of iron and for converting manganese in situ to manganese chloride ($MnCl_2$) below its melting point. Also, chlorine is recovered in the subsequent dissociation of manganese chloride so as to be reuseable in the chloridizing reactor. Thus, while operative equivalents of chlorine as the chloridizing gas may be found and used without departing from the basic principles of the present invention, the use of chlorine is much to be preferred from the standpoint of present availability, economy, and convenience.

If the charge contains a substantial amount of iron to be separated, chlorine from the source 4 may be fed through conduits 5, 6, and 7 into the bottom of the reactor 3 and upwardly through the bed of material in the reactor to convert the iron therein to ferric chloride ($FeCl_3$), which volatilizes as it is formed. The gaseous ferric chloride and any excess chlorine pass out of the top of the reactor 3 through conduits 8 and 9 and into a condenser 12, where the ferric chloride is condensed. Non-condensable gases in the gaseous stream from the reactor 3, including any excess chlorine present, continue through the condenser and out through the conduit 13. If desired, excess chlorine may be returned to the system through conduit 18 (shown by dotted lines in the drawing).

During the above described iron removal operation, the temperature of the charge in the reactor 3 need only be maintained as high as about 350° C., though higher temperatures accelerate the reaction. During the subsequent operation of chloridizing the manganese and alkali metal constituents, the temperature should be at least as high as 500° C. and preferably close to 650° C. Thus, the passage of chlorine through the charge to remove iron as described, may be commenced during heating of the charge up to the desired temperature for chloridizing manganese and alkali metals in situ. Since the higher, final, chloridizing temperature is not high enough to impair the selectivity of the iron removal reaction (accompanied by volatilization of any sulfur present and sublimation of sulfur and phosphorus chlorides), this iron removal operation may be continued during the chloridizing of the manganese and alkali metals and as long as necessary to effect removal of the iron as completely as may be desired. The temperature of the condenser 12 may be maintained high enough so that phosphorus chlorides will not be condensed therein, but will be removed through conduit 13 along with any excess chlorine so as to leave in the condenser 12 a ferric chloride by-product of high purity.

Heating of the charge may be regulated so that the iron removal operation is completed by the time the temperature of the charge in the reactor reaches the range of about 500° to 650° C. at which the manganese and alkali metals are preferably chloridized for maximum reaction efficiency. In any event, some chloridizing of the manganese and alkali metal components of the charge may occur below 500° C. during the iron removal operation.

At the conclusion of the iron removal operation, or at the beginning of the chloridizing operation if the amount of iron to be removed is not excessive, the conduit 9 and condenser 12 may be cut out of the system by means of appropriate valves (not shown), thereby forming a closed continuous gas circuit in which the reactor 3, conduits 7 and 15, a second condenser 16, and conduits 17 and 8 are connected in series, the conduit 6 remaining connected into this circuit to supply additional chlorine at the required rate. The direction of gas flow in this circuit, when processing very finely divided materials, is preferably in a downward direction through the reactor so that relatively high gas velocities may be employed with a reduced tendency to carry finely divided manganese chloride out of the reactor as it is formed. In this manner, the bed of finely divided material can serve as its own filter, and relatively high gas velocities may be employed to increase the rate of reaction. No chloridizing reagent is lost by the use of high gas velocities since unreacted chloridizing gas passing out of the reactor from the bottom thereof is recirculated through conduits 7 and 15, condenser 16, and conduits 17 and 8, and back into the top of the reactor for repeated contact with the reactor charge.

While chloridizing manganese, the temperature of the charge in the reactor is preferably held as close to the melting point of manganese chloride (about 650° C.) as possible, without causing any appreciable melting of the manganese chloride. In this manner, any attack on the lining of the reactor and any tendency for the gas permeability of the charge to be impaired by accumulation of molten manganese chloride is avoided. The temperature of the condenser 16 is preferably kept low enough to condense phosphorus chloride, sulfur, sulfur chloride, and any other volatile materials which may still be evolved from the charge in the reactor.

A cleaning and drying tower for the recycled chlorine, valves and blowers for maintaining the direction and desired rate of gas flow, and similar conventional equipment would also be used in the system, as one skilled in the art would recognize. However, these conventional manipulative devices have been omitted for the sake of simplicity.

Obviously, if condensation of other volatile material with the $FeCl_3$ during the iron removal operation is not objectionable, condenser 12 may be eliminated and condenser 16 used in its place for condensing iron chloride as well as the other volatile material. Alternatively, any number of condensers, maintained at progressively decreasing temperatures, may be employed to separately collect volatilized materials by fractional condensation.

As a further variant, particularly if the amount of iron to be removed from the charge material is relatively small, the iron removal operation and the operation of chloridizing manganese and alkali metals may be performed successively, as first described, or simultaneously at the optimum temperature for the latter operation, with the illustrated condensers 12 and 16 connected in parallel in the closed circuit (utilizing conduit 18) and the gas flow being run downward through the reactor at all times.

As should also be apparent, the gas-solid reactions may be performed while continuously moving the solids downward through the reactor. Also, standby condensers may be connected in parallel with either or both of the condensers 12 and 16 so that one may be in service while another is being emptied of condensed solids. These and other obvious variants of the particular system described and shown in the drawing may be practiced as desired without departing in any respect from the principles of the present invention.

The flow of chlorine for chloridizing the manganese and alkali metal constituents in situ in the reactor, without appreciable melting or volatilization of the manganese and alkali metal chlorides, is continued for such time as is required to carry this reaction substantially to completion. The time required will vary with the temperature employed, the size, composition, and porosity of the charge, the rate of flow of the chloridizing reagent, and other factors. When this reaction has gone substantially to completion, in the case of a batch operation (or continuously at a rate depending upon the many obvious variables involved), the charge is removed from the bottom of the reactor 3 and transferred by a suitable transportation device 20, into a heated leaching tank 21 for performing a conventional type of leaching with water, preferably held at or close to its boiling point, in order to quickly dissolve the manganese and alkali metal chlorides. To facilitate solution of these chlorides, a mixer 22 may be employed, or any desired equivalent leaching procedure may be practiced. Obviously, any equivalent liquid-solids contacting apparatus may be used in place of a leaching tank.

When processing commonly available manganese containing materials of the types mentioned, manganese and alkali metals are the only constituents of the charge that are chloridized in situ, i. e., not removed during the chloridizing operation. The other constituents remaining in the chloridized residue, and which may be termed "gangue," are substantially unchanged from their original form and are substantially insoluble in water. When the gangue constituents contain much finely divided material, as may be the case due to attrition of the original granular material, fine gangue particles may be difficult to separate completely from a leach liquor by any simple, yet reasonably rapid, settling operation. Therefore, actual filtration of the leach liquor for this purpose may be necessary in some instances. However, any desired form of liquid-solids separator, combined with or separate from the leaching apparatus, may be employed. When filtering is practiced, the slurry from the leaching tank 21 may be fed through conduit 23 to any conventional type of filter 24, preferably one of the continuous vacuum type, such as a rotary Oliver filter or the like. The gangue discharge from the filter is indicated by the arrow 25, and the vacuum line is designated 26.

The filtrate from the filter 24, or the liquor solution from any equivalent solids separator that may be employed, may be fed through a conduit 27 to any conventional form of crystallizer-evaporator 28 for recovery of the manganese and alkali metal chlorides from the bulk of the water. Crystallized manganese and alkali metal chlorides recovered from the evaporator 28 may be fully dried, preferably while removing as much water of crystallization as possible, in any conventional drier 29. These chlorides are then suitable for charging into a fused salt type of electrolytic cell 30.

As indicated above, electrolytic dissociation of manganese chloride to deposit manganese metal at the cathode of the cell may be effectively carried out by electrolyzing molten manganese chloride in a molten alkali metal chloride bath vehicle. Potassium and sodium chlorides and mixtures thereof in any proportions may be used with practically equal effectiveness as the bath vehicle. Also, lithium chloride may be present in substantial quantity without impairing the efficiency of the electrolysis or the purity of the manganese metal product. Thus, whatever proportions of these three alkali metals may be present in the starting material introduced into the chloridizing reactor 3 and be moved through the process with the manganese, are not only acceptable in the fused salt bath produced in the electrolytic cell 30, but provide at least a part of a desirable fused salt vehicle.

The only significant effect of variations in the proportions of the different alkali metals introduced into the electrolytic cell is that the required bath temperature will vary accordingly. Salt mixtures often form eutectic compositions having melting points well below those of the components of the mixtures, and all of the melting points of all proportions of all alkali metal chloride-manganese chloride mixtures have not been explored, but all melting points encountered are well within the practical bath operating temperatures in the electrolytic cell. The lower the melting point of the bath throughout the operation, until final exhaustion of the manganese chloride, the less heat is required to maintain the bath in the desired highly fluid condition.

When processing precipitator dusts of the character shown in Table 1 above, the predominant alkali metal is potassium; the amount of sodium is from about one-fifth to about one-eighth the amount of potassium; lithium is present in insignificant amounts, or not at all; and the total amount of alkali metal is considerably less than the amount of manganese. Additional alkali metal chloride may be added, if desired, to lower the initial melting point of the bath, but this is normally not necessary or desirable, since depletion of the bath as electrolysis proceeds produces higher and higher alkali metal chloride concentrations in the bath. Thus, such additions increase the amount of alkali metal chlorides to be disposed of in the end.

A suitable electrolytic cell for the purposes of this invention, contrary to prior belief, may comprise a simple, heat resistant iron alloy pot 31 constituting the cathode and a carbon rod 32 suitably suspended in the bath and constituting the anode. The pot alloy may suitably be Inconel or ferrochromium. Electrical leads 32 and 33, respectively, connect the anode and cathode to the appropriate terminals of a motor generator set 34. The voltage applied may suitably range from about 7 to 12 volts and may be varied, along with the spacing of the anode and cathode, to provide a suitable current flow and, to some degree, to control the particle size of the manganese, which is deposited as rather small granules or crystals in a somewhat adherent, agglomerated form about the wall of the pot 31, as indicated at 35. Generally, the deposit is readily broken down into the constituent grains or crystals, some of which commonly fall to the bottom of the pot as the metal deposit increases in thickness.

Periodically, as needed, more of the manganese and alkali metal chlorides recovered from the starting material may be added, and excess alkali metal chloride accumulating in the cell may be removed, to maintain a proper bath level. As the deposit of manganese grows sufficiently to make its removal desirable, the bath should be exhausted of manganese chloride. After decanting off the bulk of the alkali metal chloride, the remaining contents of the pot may suitably be dumped into a heated centrifuge 36 for separation of the bulk of the remaining alkali metal chloride from the solid manganese metal, as has long been the practice in the commercial production of beryllium by fused salt electrolysis of its chloride. Less effective and convenient separation may be performed by decanting the molten bath from the pot and then raking out the manganese deposit. Final and more complete separation of the frozen residue of alkali metal chloride from the mass of manganese metal may be effected by heating in a suitable crucible to melt and separate the alkali salt as a floating layer above the manganese metal. On cooling and solidifying this melt, the stratified alkali salt and manganese metal may be cleanly separated at their interface to leave the manganese in substantially pure, massive form.

Dissociation of manganese chloride in the electrolytic cell releases chlorine from the anode in a substantially completely anhydrous form suitable for recirculation through conduit 6 for reuse in the chlorinator 3. Recovering the chlorine in useable form is an important contribution to the economy of the process. The chlorine may be collected by fan-induced suction as it rises from the bath by means of a conventional hood or the like (not shown) and may be freed of entrained air and moisture by well known procedures. Alternatively, in order to reduce air and moisture dilution of the chlorine, the pot may be provided with a cover (not shown) having a suitable salt charging door and an opening communicating with the conduit through which the chlorine is drawn.

By means of the process described, from 90% to 95% or more of the manganese content of precipitator dusts, of the compositions shown in Table I, may be recovered as massive manganese of a purity around 98% or better, depending on the final purification procedure employed. If high purity is not of great importance and appreciable surface oxide is not objectionable, the manganese granules recovered from the electrolytic cell may simply be washed with water to remove the entrained alkali metal chlorides. Obviously, if desired, other recovery and final purification procedures may be performed on the metal product of the electroltyic cell, according to any special requirements of particular end uses for which the metal product is intended.

As indicated above, and as should be apparent, the process is equally applicable to the recovery of manganese from a variety of ores, metallurgical slags and tailings, and similar materials containing appreciable amounts of manganese, with or without iron in almost any proportion.

The simplicity of the system as a whole and of its individual components and the inherent efficiency of each individual operation render the process highly useful and economical for recovering manganese metal from materials heretofore considered useless for that purpose or, in many instances, useless for any practical commercial purpose.

As will be apparent from the foregoing specification, the invention is not limited to the specific details of apparatus, manipulative operations, and reagents specifically shown or described, but is subject to numeraus modifications without departing from the invention as defined in the appended claims.

Having described our invention, we claim:

1. A process for recovering manganese values in useful form from materials containing manganese as metal, or as oxide, or both, together with gangue materials, comprising contacting a mass of such material with a gaseous chloridizing reagent containing free chlorine, at a temperature between about 315° and 650° C. to convert the manganese to manganese chloride, then leaching the mass with water to dissolve the manganese chloride, mechanically separating the chloride solution from undissolved components of the mass, evaporating the water from the leach solution to recover the manganese chloride, disassociating the manganese chloride by fused salt electrolysis to free the manganese as metal and release chlorine, and utilizing the released chlorine as gaseous chloridizing reagent for converting additional manganese to manganese chloride in the process.

2. A process for recovering manganese values in substantially pure metallic form from materials containing manganese and iron as metals, as oxides, or both, together with gangue materials including alkali and alkaline earth metal oxides, comprising contacting a mass of such material with chlorine gas at a temperature between about 315° and 650° C., regulating the flow of chlorine to convert the manganese, iron, and alkali metal to chlorides while separating the iron chloride by sublimation and retaining the manganese chloride and alkali metal chloride in situ in the mass without appreciable fusion or volatilization of the manganese and alkali metal chlorides, leaching the manganese chloride and alkali metal chloride from less soluble components of the mass with water, recovering and drying the dissolved manganese and alkali metal chlorides from the leach water, and dissociating the dry manganese chloride by electrolysis in a fused alkali metal chloride bath containing the recovered and dried alkali metal chloride to deposit the manganese as metal.

3. The process of claim 2 in which chlorine released from the fused bath is recovered therefrom and utilized in the process to chlorinate more of the starting material.

4. A process for recovering manganese values in useful form from materials containing manganese as metal, or as oxide, or both, together with oxides of iron, alkali metals, and alkaline earth metals, comprising contacting a mass of such material with a gaseous chloridizing agent containing free chlorine, at a temperature between about 315° and 650° C. sufficient to convert the manganese to manganese chloride, and the iron to ferric chloride, and the alkali metal to alkali metal chloride, while volatilizing the ferric chloride from the mass and leaving the manganese and alkali metal chlorides therein, leaching the manganese and alkali metal chlorides from insoluble components of the mass, mechanically separating the chloride leach liquor from the insoluble components, and recovering from the leach liquor the manganese and alkali metal chlorides substantially free from iron and alkaline earth metal compounds.

5. A process according to claim 4 in which said temperature is in the range of about 500° to 650° C.

6. A process for recovering manganese values in useful form from materials containing manganese as metal, or as oxide, or both, together with oxides of iron, alkali metals, and alkaline earth metals, comprising contacting a mass of such material with a gaseous chloridizing agent containing free chlorine, at a temperature in the range of about 350° to 650° C. to convert the manganese and alkali metals to chlorides in situ in the mass while converting the iron to ferric chloride and volatilizing the same from the mass, leaching the manganese and alkali metal chlorides from insoluble components of the mass, mechanically separating the chloride leach liquor from the insoluble components, and recovering from the leach liquor the manganese and alkali metal chlorides substantially free from iron and alkaline earth metal compounds.

7. A process according to claim 6 in which the leaching is performed essentially with water maintained substantially at the boiling point to dissolve substantially all of the manganese and alkali metal chlorides while leaving less soluble components of the mass undissolved.

8. A process for recovering manganese values in useful form from materials containing manganese as metal, or as oxide, or both, together with oxides of iron, alkali metals, and alkaline earth metals, comprising contacting a mass of such material with a gaseous chloridizing agent containing free chlorine, at a temperature between about 315° and 650° C. sufficient to convert the manganese to manganese chloride, and the iron to ferric chloride, and the alkali metal to alkali metal chloride, while volatilizing the ferric chloride from the mass and leaving the manganese and alkali metal chlorides therein, leaching the manganese and alkali metal chlorides from insoluble components of the mass, mechanically separating the chloride leach liquor from the insoluble components, recovering from the leach liquor the manganese and alkali metal chlorides substantially free from iron and alkaline earth metal compounds, and electrolyzing the manganese chloride in a fused salt bath to deposit the manganese as metal.

9. A process for recovering manganese values in useful form from materials containing manganese as metal, or as oxide, or both, together with oxides of iron, alkali metals, and alkaline earth metals, comprising contacting a mass of such material with a gaseous chloridizing agent containing free chlorine, at a temperature between about 315° and 650° C. sufficient to convert the manganese to manganese chloride, and the iron to ferric chloride, and the alkali metal to alkali metal chloride, while volatilizing the ferric chloride from the mass and leaving the manganese and alkali metal chlorides therein, leaching the manganese and alkali metal chlorides from insoluble components of the mass, mechanically separating the chloride leach liquor from the insoluble components, recovering from the leach liquor the manganese and alkali metal chlorides substantially free from iron and alkaline earth metal compounds, and electrolyzing the manganese chloride in a fused salt bath to deposit the manganese as metal and release chlorine, and utilizing the released chlorine to chloridize additional material in the process.

10. A process for recovering manganese values in useful form from materials containing manganese as metal, or as oxide, or both, together with oxides of iron, alkali metals, and alkaline earth metals, comprising contacting a mass of such material with a gaseous chloridizing agent containing free chlorine, at a temperature between about 315° and 650° C. sufficient to convert the manganese to manganese chloride, and the iron to ferric chloride, and the alkali metal to alkali metal chloride, while volatilizing the ferric chloride from the mass and leaving the manganese and alkali metal chlorides therein, leaching the manganese and alkali metal chlorides from insoluble components of the mass, mechanically separating the chloride leach liquor from the insoluble components, recovering from the leach liquor the manganese and alkali metal chlorides substantially free from iron and alkaline earth metal compounds, electrolyzing the manganese chloride in a fused salt bath which includes alkali metal chloride recovered from the leach liquor with the manganese chloride, to deposit manganese metal, and separating the manganese metal from the fused salt bath.

11. A process for recovering manganese values in useful form from materials containing manganese as metal, or as oxide, or both, together with oxides of iron, alkali metals, and alkaline earth metals, comprising contacting a mass of such material with a gaseous chloridizing agent containing free chlorine, at a temperature between about 315° and 650° C. sufficient to convert the manganese to manganese chloride, and the iron to ferric chloride, and the alkali metal to alkali metal chloride, while volatilizing the ferric chloride from the mass and leaving the manganese and alkali metal chlorides therein, leaching the manganese and alkali metal chlorides from insoluble components of the mass, mechanically separating the chloride leach liquor from the insoluble components, recovering from the leach liquor the manganese and alkali metal chlorides substantially free from iron and alkaline earth metal compounds, electrolyzing the manganese chloride in a fused salt bath which includes alkali metal chloride recovered from the leach liquor with the manganese chloride, to deposit manganese metal and release chlorine, and utilizing the released chlorine to chloridize additional material in the process.

12. A process for recovering manganese values in useful form from materials containing manganese as metal, or as oxide, or both, together with oxides of iron, alkali metals, and alkaline earth metals, comprising contacting a mass of such material with a gaseous chloridizing agent containing free chlorine, at a temperature between about 315° and 650° C. sufficient to convert the manganese to manganese chloride, and the iron to ferric chloride, and the alkali metal to alkali metal chloride, while volatilizing the ferric chloride from the mass and leaving the manganese and alkali metal chlorides therein, leaching the mass with water to dissolve the manganese and alkali metal chlorides, filtering the chloride solution to separate the dissolved chlorides from undissolved components of the mass, evaporating the water from the filtrate to recover the manganese and alkali metal chlorides substantially free from iron and alkaline earth metal compounds, electrolyzing the manganese chloride in a fused salt bath which includes alkali metal chloride recovered with the manganese chloride to deposit manganese metal, and recovering the manganese metal from the fused salt bath.

13. A process for recovering manganese values in useful form from materials containing manganese as metal, or as oxide, or both, together with oxides of iron, alkali metals, and alkaline earth metals, comprising contacting a mass of such material with a gaseous chloridizing agent containing free chlorine, at a temperature between about 315° and 650° C. sufficient to convert the manganese to manganese chloride, and the iron to ferric chloride, and the alkali metal to alkali metal chloride, while volatilizing the ferric chloride from the mass and leaving the manganese and alkali metal chlorides therein, leaching the mass with water to dissolve the manganese and alkali metal chlorides, filtering the chloride solution to separate the dissolved chlorides from undissolved components of the mass, evaporating the water from the filtrate to recover the manganese and alkali metal chlorides substantially free from iron and alkaline earth metal compounds, electrolyzing the manganese chloride in a fused salt bath which includes alkali metal chloride recovered with the manganese chloride to deposit manganese metal and release chlorine, recovering the manganese metal from the fused salt bath, and utilizing the released chlorine to chloridize additional material in the process.

References Cited in the file of this patent
UNITED STATES PATENTS

| Number | Name | Date |
|---|---|---|
| 2,176,776 | Sweet et al. | Oct. 17, 1939 |
| 2,658,813 | Whitehouse et al. | Nov. 10, 1953 |
| 2,709,131 | Marshall | May 24, 1955 |
| 2,752,299 | Cooper | June 26, 1956 |
| 2,752,301 | Cooper | June 26, 1956 |
| 2,766,115 | Graham et al. | Oct. 9, 1956 |
| 2,843,472 | Eberhardt | July 15, 1958 |